(12) United States Patent
Montagne

(10) Patent No.: US 6,558,972 B2
(45) Date of Patent: May 6, 2003

(54) METHOD OF FABRICATING ACTIVE ELEMENTS FOR A LASER SOURCE

(75) Inventor: Jean-Eucher Montagne, Orleans (FR)

(73) Assignee: Compagnie Industrielle des Lasers Cilas, Marcoussis (FR)

(*) Notice: Subject to any disclaimer, the term of this patent is extended or adjusted under 35 U.S.C. 154(b) by 0 days.

(21) Appl. No.: 10/013,348

(22) Filed: Dec. 13, 2001

(65) Prior Publication Data
US 2002/0085607 A1 Jul. 4, 2002

(30) Foreign Application Priority Data
Dec. 26, 2000 (FR) .............................. 00 17021

(51) Int. Cl.[7] .................. H01L 21/00; H01L 21/30; H01L 21/46
(52) U.S. Cl. .................. 438/33; 438/458; 438/462
(58) Field of Search .............................. 438/28, 29, 33, 438/45, 46, 458, 460, 462

(56) References Cited

U.S. PATENT DOCUMENTS

| 5,776,794 A | * 7/1998 | McCann ................ 438/46 |
| 6,159,771 A | * 12/2000 | Sheng-Hsiung .......... 438/113 |
| 6,379,985 B1 | * 4/2002 | Cervantes et al. ........ 438/33 |

FOREIGN PATENT DOCUMENTS

| EP | 0404634 | 12/1990 |
| EP | 1115186 | 7/2001 |

OTHER PUBLICATIONS

Patent Abstracts of Japan, vol. 017, No. 378 (E–1398), Jul. 15, 1993 & JP 05 063263 A (Hoya Corp), Mar. 12 1993.
Patent Abstract of Japan, vol. 1996, No. 04, Apr. 30, 1996 & JP 07 321394 A (Nec Corp), Dec. 8 1995.

* cited by examiner

*Primary Examiner*—John F. Niebling
*Assistant Examiner*—Viktor Simkovic
(74) *Attorney, Agent, or Firm*—Stevens, Davis, Miller & Mosher, LLP

(57) ABSTRACT

According to this method, in order to fabricate active elements which comprise at least one doped part comprising a doping capable of absorbing a pump beam and at least one undoped part, and which have opposed faces of the same geometrical shape, a process of preparing an elongate active rod (5), which has a cross section identical to said geometrical shape, said process comprising at least one step of cutting and one step of joining at least one doped block (6) and at least one undoped block (7, 8), and a process of forming a plurality of active elements from the active rod (5), said formation process comprising at least one step of transverse cutting along the active rod (5) and the step of collectively treating surfaces of the active elements, are carried out in succession.

12 Claims, 2 Drawing Sheets

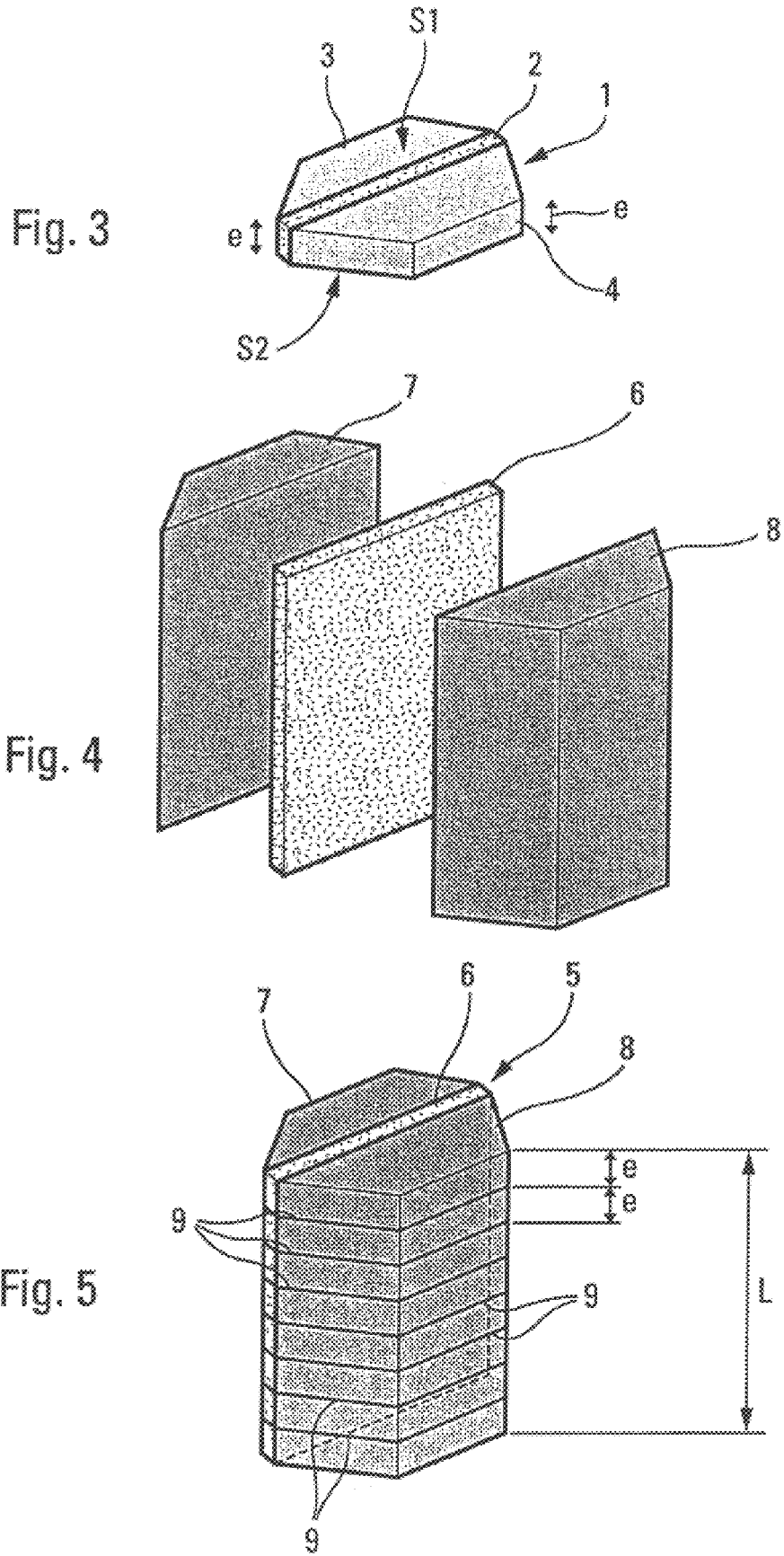

METHOD OF FABRICATING ACTIVE ELEMENTS FOR A LASER SOURCE

The present invention relates to a method for fabricating active elements for a laser source.

It is known that a laser source generally comprises at least:

an at least partially doped active element, in which a stimulated amplification (laser) phenomenon is generated;

a pumping system generating a pump beam which is emitted in said active element so as to provide the energy needed for said laser amplification; and an optical cavity which endows the laser beam obtained by this amplification with its directivity and geometrical characteristics.

More particularly, the present invention relates to the fabrication of active elements comprising at least one doped part comprising an absorbent doping capable of absorbing a pump beam in order to amplify laser radiation and at least one undoped part, not comprising such an absorbent doping.

Within the scope of the present invention, the term "undoped" part or block refers to a part or a block not comprising said absorbent doping, that is to say a part or a block which does not absorb the pump (pump beam). Nevertheless, this part and this block may include a particular doping intended for a purpose other than absorbing the pump.

In order to fabricate an active element of this sort, the following operations are generally carried out in succession:

a) the element forming the undoped part is cut and polished;

b) the element forming the doped part is cut and polished;

c) these two elements are joined so as to form an active element; and d) the surfaces of this active element are treated.

Of course, when it is desired to fabricate a plurality of such active elements, it is necessary to carry out the aforementioned sequence of operations a) to d), individually, for each of these active elements.

Consequently, the fabrication of a plurality of identical active elements is lengthy and expensive.

The object of the present invention is to overcome these drawbacks. It relates to a method for fabricating, quickly, efficiently and at reduced cost, active elements for a laser source.

According to the invention, said method for fabricating active elements for a laser source, each of said active elements comprising at least one doped part comprising an absorbent doping capable of absorbing a pump beam in order to amplify laser radiation and at least one undoped part, not comprising such an absorbent doping, each of said active elements having a first face and a second opposed face each of which has the same geometrical shape and which are separated one from the other by a predefined distance, is noteworthy in that the following is carried out in succession:

A) a process of preparing an elongate active rod, which has a cross section identical to said geometrical shape and a length at least twice the size of said predefined distance between the first and second faces of an active element, said preparation process comprising at least one cutting step and a step of joining at least one doped elongate block comprising said absorbing doping and at least one undoped elongate block not comprising said absorbent doping; and B) a process of forming a plurality of active elements from said active rod, said formation process comprising at least one step of transversely cutting along said active rod and a step of collectively treating surfaces of said active elements.

Thus, by virtue of the invention for fabricating active elements, a semifinished product (the active rod) is produced, which makes it possible to carry out collectively, that is to say for all the active elements to be fabricated, at least:

the joining [of the doped and undoped block(s)], during the rod preparation process; and the treatment of surfaces, during the process of forming active elements.

Consequently, the active elements can be fabricated quickly and at reduced cost, since, instead of carrying out a plurality of individual operations for each of the joining and surface treatment steps, only a single simple collective operation is carried out.

In a first embodiment, during said formation process, the following is carried out in succession:

a) said step of collectively treating surfaces, consisting in treating the surfaces of said active rod; and b) said transverse cutting step consisting in cutting said active rod treated in this way so as to form a plurality of active elements comprising said first and second faces separated one from the other by said predefined distance.

Furthermore, in a second embodiment, during said formation process, the following is carried out in succession:

a) said transverse cutting step consists in cutting said active rod so as to form a plurality of active elements comprising said first and second faces separated one from the other by said predefined distance; and b) said step of collectively treating surfaces, wherein at least some of the active elements formed in this way are reassembled by simply bringing the first and second faces into contact so as to obtain an at least partially reconstructed active rod and the surfaces thereof are treated, that is to say the surfaces of said reassembled active elements are treated collectively.

Preferably, during said formation process, the cut faces corresponding to said first and second faces of the active elements are polished, after the transverse cutting step. However, if the cutting step is accurate enough, it is possible that the cut faces may not have to be polished.

In addition, at said cutting step:

in a first variant, transverse cuts are carried out successively by means of the same diamond saw; and in a second variant, a plurality of transverse cuts are carried out simultaneously by means of a saw comprising a comb of parallel blades, which makes it possible to reduce the cutting time and therefore the implementation time of the fabrication method according to the invention.

Moreover, during said process of preparing the active rod, in a first variant, the following are carried out in succession:

a) said cutting step, consisting in cutting said elongate blocks [doped and undoped] to sizes such that, when they are joined one to the other, they form said active rod having a cross section identical to said geometrical shape and a length which is at least twice said predefined distance between the first and second faces of an active element; and b) said joining step consisting in joining said elongate blocks so as to form said active rod.

Furthermore, in a second variant, the following are carried out in succession:

a) said joining step consisting in joining said elongate blocks so as to form an active unit; and b) said cutting step, consisting in cutting said active unit so as to obtain said active rod having the desired dimensions, that is to say a cross section identical to said geometric shape and a length which is at least twice said predefined distance between the first and second faces of an active element.

Moreover, according to the invention, during or before said preparation process, or after the formation of the active rod, the faces of said elongate blocks, which are visible when said elongate blocks are in a position corresponding to the joining position, are polished.

Although, within the context of the present invention, the blocks may be joined one to the other by means of various known techniques, such as adhesive bonding for example, this joining is preferably carried out by means of welding of the normal type.

In a particular embodiment, said active rod is formed from one doped elongate block and from two undoped elongate blocks. In this case, preferably, said doped elongate block has the shape of a plate and said two undoped elongate blocks are identical and are attached on either side of said plate.

The figures of the appended drawing will make it easier to understand how the invention can be produced. In these figures, identical references denote similar elements.

FIG. 3 shows, in perspective, an active element capable of being fabricated by the method according to the invention.

FIG. 4 shows several elongate blocks, designed to be secured one to the other in order to form an active rod.

FIG. 5 illustrates an active rod obtained from the elongate blocks shown in FIG. 4 and designed for the production of a plurality of active elements of the sort shown in FIG. 3.

Figure 2:
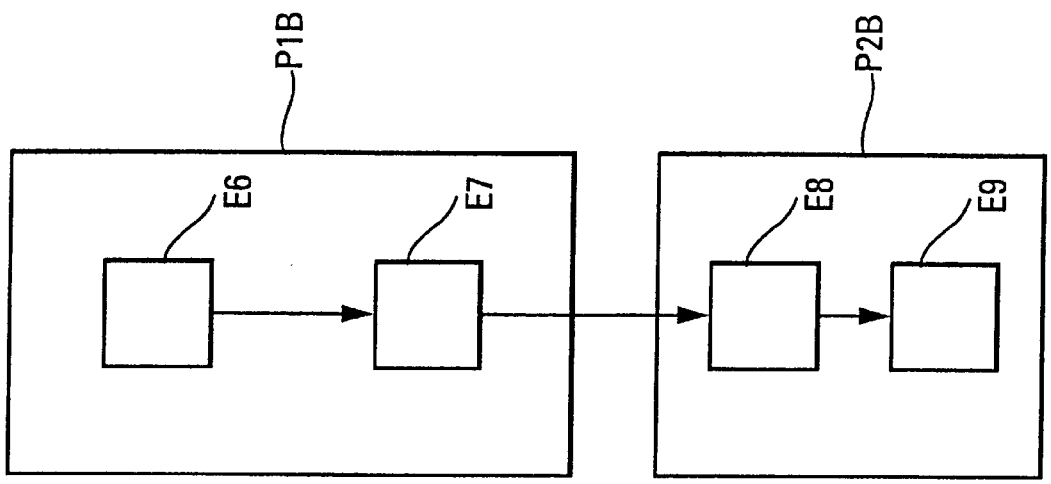
FIGS. 1 and 2 illustrate the successive steps respectively of two variants of the method according to the invention.
Figure 1:
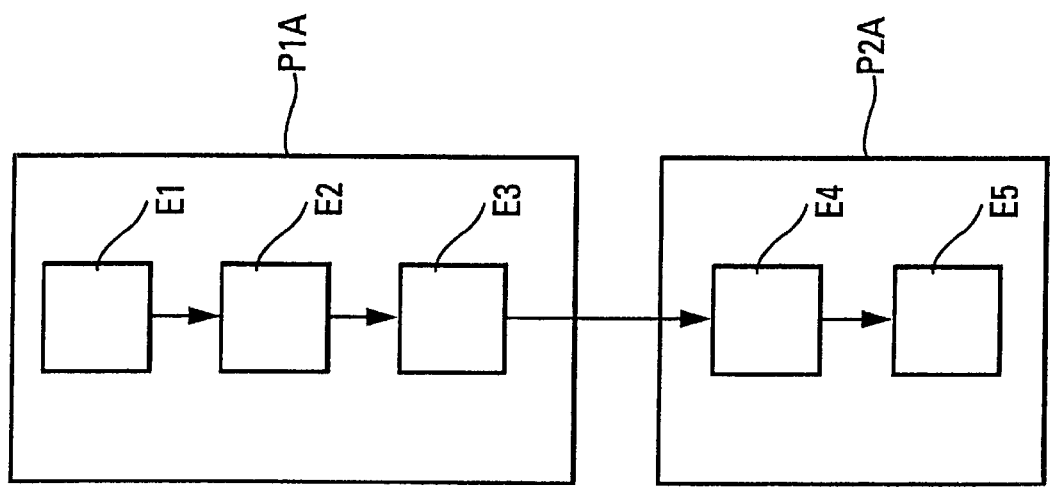

The method according to the invention is illustrated schematically according to two different embodiments in FIGS. 1 and 2, and intended to fabricate active elements for a laser source, for example elements such as the active element 1 shown by way of illustration in FIG. 3.

Such an active element 1 which, in a known manner, can be combined with a pumping system and an optical cavity (not shown) in order to form a laser source, comprises at least one doped part 2 comprising a normal absorbent doping, capable of absorbing a pump beam in order to amplify laser radiation, and at least one undoped part 3, 4 not comprising such an absorbent doping, undoped part 3, 4 which is generally intended to transmit the pump beam to the doped part 2. The example of the active element 1 shown in FIG. 3 comprises two undoped parts 3 and 4, which are identical and which are arranged on either side of said doped part 2.

Said fabrication method, making it possible to fabricate a plurality of identical active elements 1, is noteworthy according to the invention in that the following are carried out in succession:

A) a process P1A or P1B for preparing an elongate active rod 5 which is shown in FIG. 5 and which has:
  a cross section which is identical to the geometrical shape of opposed and identical surfaces S1 and S2 (upper and lower surfaces) of the active elements 1 to be fabricated (FIG. 3); and
  a length L which is at least twice the thickness $e$ (that is to say the distance between the parallel surfaces S1 and S2) of the active elements 1 to be fabricated. Preferably, the length L is ten to twenty times greater than the thickness $e$.

Said preparation process P1A, P1B comprises, as stated below, at least one cutting step and a step of joining together at least one doped elongate block 6 comprising said absorbent doping and at least one undoped elongate block 7, 8 not comprising said absorbent doping; and B) a process P2A, P2B of forming a plurality of active elements 1 from said active rod 5, said formation process comprising as stated below, at least one step E5, E8 of transversely cutting along said active rod 5 and a step E4, E9 of collectively treating surfaces of said active elements 1.

It will be noted that the surface treatment consists, in the normal manner, especially in producing coatings (for example metal or multi-dielectric coatings) according to the optical characteristics which it is desired to obtain.

Thus, by virtue of the invention, in order to fabricate active elements 1, a semifinished product (the active rod 5) is produced, which makes it possible to carry out collectively, that is to say for all the active elements to be fabricated, at least:
  the joining (of the elongate blocks), during the process P1A, P1B of preparing the rod 5; and
  the treatment of the surfaces, during the process P2A, P2B of forming active elements 1.

Consequently, the active elements 1 can be fabricated quickly and at low cost, since, instead of carrying out a plurality of individual operations for each of the steps of joining and treating surfaces, only a single simple collective operation is carried out.

It will be noted that the method according to the invention is not limited by the geometrical shape of the surfaces S1 and S2, it being possible to envision any geometrical shape, nor by the numbers of doped part(s) and of undoped part(s) of the active elements 1.

In a first embodiment P1A illustrated in FIG. 1, the process of preparing the active rod 5 comprises the following successive steps:
  a) a step E1 of cutting and polishing the doped block 6;
  b) a step E2 of cutting and polishing the undoped blocks 7 and 8; and
  c) a step E3 of joining these various blocks 6, 7 and 8.

FIG. 4 shows the cut and polished blocks 6, 7 and 8 before the joining step E3. These blocks 6, 7 and 8 are cut according to the invention, so as to have dimensions such that, when these blocks 6, 7 and 8 are joined one to the others as shown in FIG. 5, they directly form an active rod 5 having the desired dimensions, that is to say that said active rod 5 has a cross section which is identical to the desired shape of the surfaces S1 and S2 of the active elements 1. In the exemplary embodiment of FIG. 3, this shape is octagonal.

Moreover, in a second embodiment P1B illustrated in FIG. 2, the process of preparing the active rod 5 comprises the following steps in succession:
  a) a step E6 of joining the elongate blocks 6, 7 and 8 (which do not yet have suitable dimensions) so as to form an active unit (not shown); and
  b) a step E7 of cutting and polishing said active unit so as to form an active rod 5 having the desired dimensions.

Within the context of the present invention, the joining steps E3 and E6 can be carried out using any known joining method, and in particular, by adhesive bonding.

However, preferably, the blocks 6, 7 and 8 are assembled together by means of a welding method.

A particular welding method for assembling the blocks 6, 7 and 8 may be such that the following series of operations have to be carried out in succession:

a) the surfaces to be welded of these blocks 6, 7 and 8 are polished;
b) these surfaces are cleaned, in particular chemically cleaned, very carefully;
c) the blocks 6, 7 and 8 are brought into contact, their high degree of flatness leading to their molecular adhesion;
d) the unit thus formed is heated to temperatures close to the melting point of the materials forming said blocks 6, 7 and 8; and
e) the active rod 5 thus formed is cooled slowly, in order to prevent thermal gradients inducing residual stresses.

In order to be able to implement this welding process properly, it is preferable that the materials of the various blocks 6, 7 and 8 have thermal expansion coefficients and melting points which are very close.

In addition, these materials must be chemically compatible.

However, when the various materials have incompatible thermal and chemical characteristics, it is possible to provide an interface material in order to match the expansion coefficients. In this case, the material provided will have to have enough flexibility in order to absorb the expansion differences of the various types of materials of the blocks 6, 7 and 8 to be welded.

It is also possible to envision doping the material of the blocks 7 and 8 (undoped by said absorbent doping) so as to make it compatible with the material of the block 6 (doped by said absorbent doping) without however making said material of the blocks 7 and 8 absorbing for the pump beam.

Moreover, said process of forming active elements 1 from an active rod 5 may have, in a first embodiment P2A illustrated in FIG. 1, the following steps in succession:
a) a step E4 of collectively treating surfaces, consisting in treating the various surfaces of said active rod 5; and
b) a transverse cutting step E5, consisting in transversely cutting said active rod 5 of length L along parallel cutting lines 9 spaced one from the other by said distance e, as shown in FIG. 5, so as to form a plurality of identical active elements 1 of thickness e.

For the treatment of surfaces, the active rod 5 is, for example, placed in a normal treatment bell, which especially comprises means to hold said rod 5 and means to mask all the faces of the rod 5, except for the face or faces which it is desired to treat. The rod 5 is thus placed several times in the bell, thereby successively unmasking the faces to be treated. To this end, preferably firstly faces which are easy to coat (especially the faces receiving an antireflective coating) are treated, and lastly, faces whose treatment is more delicate (dichroic) are treated.

Moreover, in a second preferred embodiment P2B illustrated in FIG. 2, said process of forming active elements 1 from the active rod 5, has the following steps in succession:
a) a transverse cutting step E8, consisting in cutting the active rod 5 along the cutting lines 9 shown in FIG. 5 in order to form a plurality of identical active elements 1; and
b) a step E9 of collectively treating surfaces, wherein at least some of the active elements 1 formed in this way are reassembled by simply bringing the first and second faces into contact first to obtain an at least partially reconstructed active rod and the surfaces thereof are treated.

This second embodiment P2B, for which the surface treatments are carried out after the cuttings, makes it possible to provide good integrity of the laser flux of the treatments.

In step E9, the active elements 1 are preferably stacked one on the other, cut face against cut face. This temporary assembly is placed in a normal treatment bell and the treatment is carried out as stated above for step E4.

It will be noted that the cut faces can go without treatment because the integrity of the active element 1 can be achieved on these faces by means of low index materials (such as polymers, for example).

Furthermore, in relation to cutting steps E5 and E8, the active rod 5 may be cut by means of successive cuts or slices, for example using a normal diamond saw, with a supply of cooling liquid to prevent heating of the cut material. However, in order to reduce the cutting time, the latter may also be achieved by means of a normal saw comprising a comb of parallel blades.

The transverse cuts which are transverse with respect to the longitudinal axis of the active rod 5 are preferably, but not exclusively, orthogonal with respect to said longitudinal axis.

If the cut is accurate enough, it is possible to dispense with the polishing of the cut surfaces.

On the other hand, if polishing is carried out after the surface treatments, it is of course appropriate to take all necessary precautions so as not to damage these treatments.

Although only two combinations (P1A-P2A; P1B-P2B) are shown in FIGS. 1 and 2, all possible combinations (P1A-P2A; P1A-P2B; P1B-P2A; P1B-P2B) of the preparation process P1A, P1B and of the formation process P2A, P2B can be envisioned within the context of the present invention.

What is claimed is:
1. A method for fabricating active elements for a laser source, each of said active elements comprising at least one doped part comprising an absorbent doping capable of absorbing a pump beam in order to amplify laser radiation and at least one undoped part not comprising such an absorbent doping, each of said active elements having a first face and a second opposed face each of which has the same geometrical shape and which are separated one from the other by a predefined distance, comprising the following steps carried out in succession:
 (a) a preparation process of preparing an elongate active rod, which has a cross section identical to said geometrical shape and a length at least twice the size of said predefined distance between the first and second faces of an active element, said preparation process comprising at least one first cutting step and a step of joining at least one doped elongate block comprising said absorbent doping and at least one undoped elongate block not comprising said absorbent doping; and
 a formation process of forming a plurality of active elements from said active rod, said formation process comprising at least one transverse cutting step of transversely cutting along said active rod and a step of collectively treating surfaces of said active elements.

2. The method as claimed in claim 1,
wherein, during said formation process, the following is carried out in succession:
 a) said step of collectively treating surfaces, consisting in treating the surfaces of said active rod; and
 b) said transverse cutting step consisting in cutting said active rod treated in this way so as to form a plurality of active elements comprising said first and second faces separated one from the other by said predefined distance.

3. The method as claimed in claim 1,
wherein, during said formation process, the following is carried out in succession:

a) said transverse cutting step consisting in cutting said active rod so as to form a plurality of active elements comprising said first and second faces separated one from the other by said predefined distance; and b) said step of collectively treating surfaces, wherein at least some of the active elements formed in this way are reassembled by simply bringing the first and second faces into contact so as to obtain an at least partially reconstructed active rod and the surfaces thereof are treated.

4. The method as claimed in claim 1, wherein, during said formation process, the cut faces corresponding to said first and second faces of the active elements are polished, after the transverse cutting step.

5. The method as claimed in claim 1, wherein successive cuts are made by means of a diamond saw, at the transverse cutting step.

6. The method as claimed in claim 1, wherein a plurality of cuts are made simultaneously at the transverse cutting step by means of a saw comprising a comb of parallel blades.

7. The method as claimed in claim 1, wherein, during said process of preparing the active rod, the following steps are carried out in succession:

a) said first cutting step, consisting in cutting said elongate blocks to sizes such that, when they are joined one to the other, they form said active rod having a cross section identical to said geometric shape and a length which is at least twice said predefined distance between the first and second faces of an active element; and b) said joining step consisting in joining said elongate blocks so as to form said active rod.

8. The method as claimed in claim 1, wherein, during said process of preparing the active rod, the following steps are carried out in succession:

a) said joining step consisting in joining said elongate blocks so as to form an active unit; and b) said first cutting step consisting in cutting said active unit so as to obtain said active rod having a cross section identical to said geometric shape and a length which is at least twice said predefined distance between the first and second faces of an active element.

9. The method as claimed in claim 1, wherein, during said process of preparing said active rod, the faces of said elongate blocks, which are visible when said elongate blocks are in a position corresponding to the joining position, are polished.

10. The method as claimed in claim 1, wherein, during said joining step, said elongate blocks are joined one to the other by means of welding.

11. The method as claimed in claim 1, wherein said active rod is formed from one doped elongate block and from two undoped elongate blocks.

12. The method as claimed in claim 11, wherein said doped elongate block has the shape of a plate and said two undoped elongate blocks, are identical and are attached on either side of said plate.

* * * * *